United States Patent [19]
Wooden

[11] Patent Number: 5,322,408
[45] Date of Patent: Jun. 21, 1994

[54] DEVICE FOR RAISING AND LOWERING AN IMPAIRED PERSON

[75] Inventor: William H. Wooden, Ishpeming, Mich.

[73] Assignee: Handi-Loft, Inc., Ishpeming, Mich.

[21] Appl. No.: 948,028

[22] Filed: Sep. 21, 1992

[51] Int. Cl.⁵ .............................................. B66F 3/22
[52] U.S. Cl. ................................ 414/495; 414/540; 414/921; 187/9 R; 244/137.2
[58] Field of Search ............... 414/399, 495, 540, 631, 414/914, 921; 182/141; 187/9 R; 244/137.2

[56] References Cited

U.S. PATENT DOCUMENTS

| | | | |
|---|---|---|---|
| 3,524,563 | 8/1970 | McCartney et al. | 414/495 X |
| 3,537,745 | 11/1970 | Herring, Jr. | 414/495 X |
| 3,806,092 | 4/1974 | Richards | 414/495 X |
| 3,888,463 | 6/1975 | O'Brien et al. | 414/921 X |
| 3,893,576 | 7/1975 | Casady | 414/921 X |
| 4,701,097 | 10/1987 | Sturtz | 414/495 |
| 4,923,357 | 5/1990 | Isogai | 414/495 |
| 4,923,973 | 5/1990 | Smith | 414/921 X |
| 4,971,510 | 11/1990 | Houle | 414/921 X |
| 5,105,915 | 4/1992 | Gary | 414/495 X |
| 5,154,569 | 10/1992 | Eryou et al. | 414/921 X |

FOREIGN PATENT DOCUMENTS 1095462 2/1981 Canada ................................ 414/921

Primary Examiner—Michael S. Huppert
Assistant Examiner—James Keenan
Attorney, Agent, or Firm—Brooks & Kushman

[57] ABSTRACT

A device (10) for raising and lowering an impaired person between the ground and a higher level for boarding and deplaning from an airplane. The device (10) comprises a wheeled frame (12) and a hydraulic lift for raising and lowering the person (14). The hydraulic lift (14) extends upwardly from the wheeled frame (12). The device (10) also comprises a platform (16) oriented transversely in relation to the hydraulic lift (14), the platform (16) being adapted for supporting the impaired person or a wheelchair in which the person reposes. The device (10) also has a protective enclosure (18) mounted upon the platform (16) which surrounds the impaired person.

7 Claims, 3 Drawing Sheets

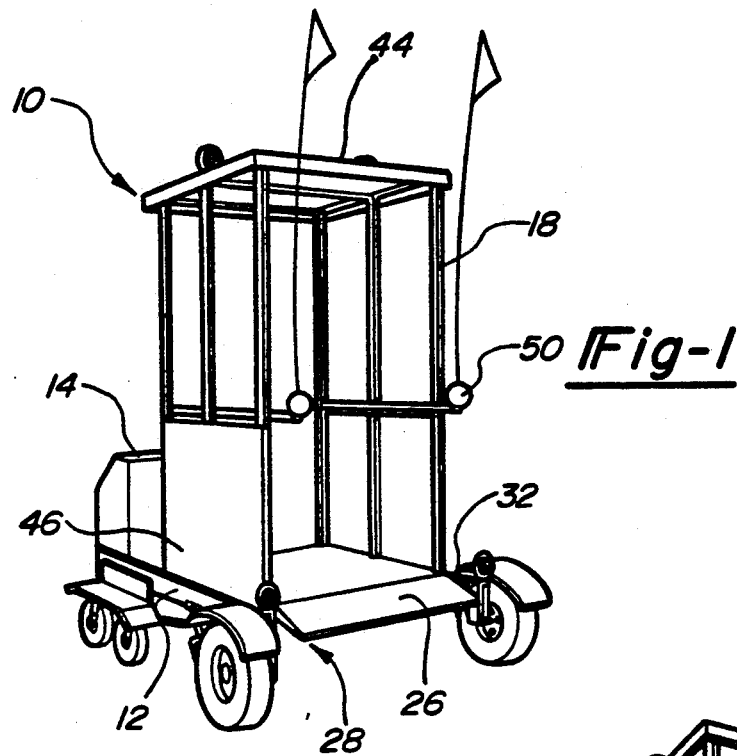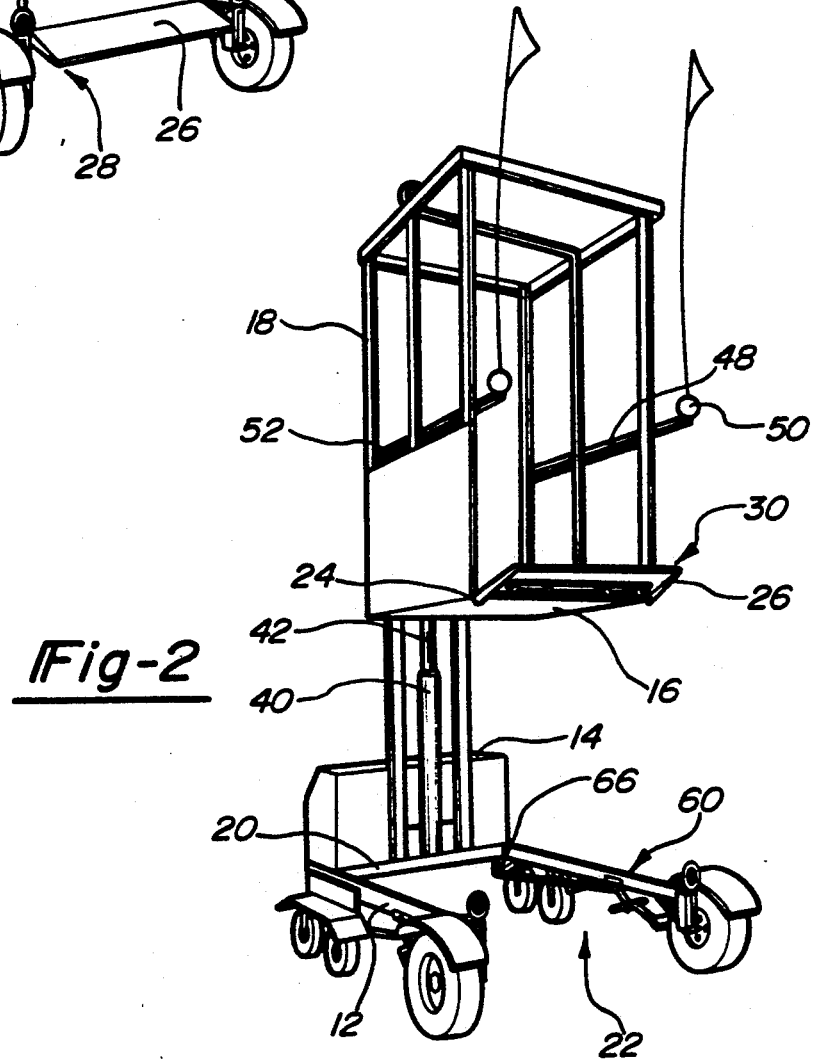

DEVICE FOR RAISING AND LOWERING AN IMPAIRED PERSON

BACKGROUND OF THE INVENTION

1. Field of the Invention

The present invention generally relates to a device for elevating an occupied wheelchair and, more particularly, is concerned with a device for raising and lowering an occupant between ground and a higher level for boarding and deplaning from an airplane.

2. Description of Background Art

An impaired person may be incapable of transitioning without assistance from ground level to the door of an airplane. This is particularly so in rural locations, where a commuter airline may be serviced by ground-based facilities which do not include moving ramps or walkways.

In such situations, the need has arisen for providing a device for raising and lowering an impaired person, who may be wheelchair-bound or stretcher-bound between the ground and a higher level for boarding and deplaning from an airplane.

SUMMARY OF THE INVENTION

The present invention provides a device for raising and lowering an impaired person between the ground and a higher level for boarding and deplaning from an airplane.

The device includes a wheeled frame. Extending upwardly from the frame is a means for raising and lowering the person, who may or may not be wheelchair-bound.

A platform is oriented transversely in relation to the raising and lowering means. The platform is adapted for supporting the impaired person or a wheelchair in which he may repose.

Surrounding the impaired person is a protective enclosure which is mounted upon the platform. The enclosure provides protection against adverse weather conditions while the device is in use.

BRIEF DESCRIPTION OF THE DRAWINGS

FIG. 1 is a perspective view of a device for raising and lowering an impaired person between the ground and a higher level, wherein the device is depicted in a lowered position;

FIG. 2 is a perspective view of a device for raising and lowering an impaired person between the ground and a higher level, wherein the device is depicted in a raised position;

BEST MODE(S) FOR CARRYING OUT THE INVENTION

Figure 3:
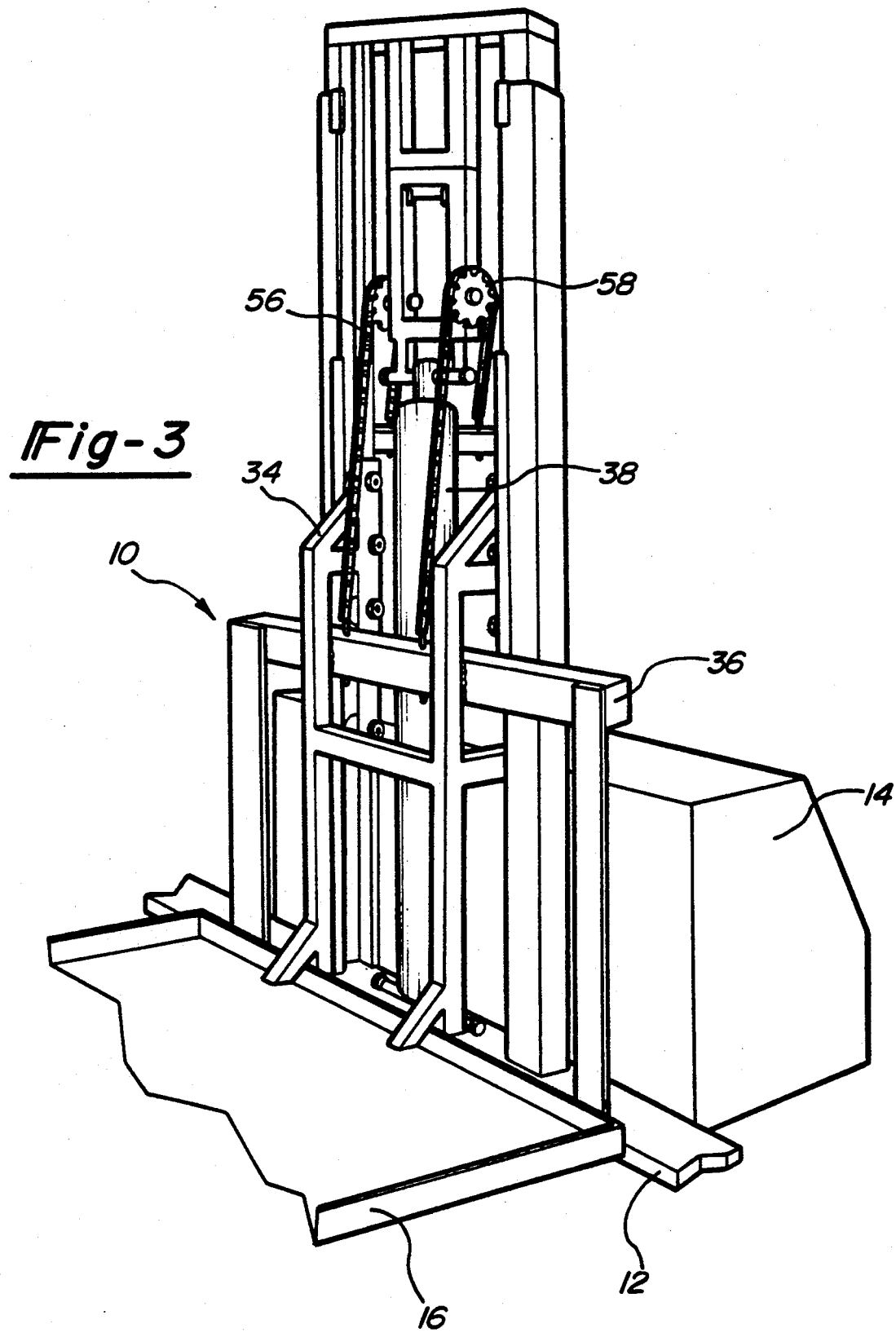
FIG. 3 is a front elevational view of the device, wherein the protective enclosure is removed, thereby revealing the raising and lowering means.

Referring now to the drawings, and more particularly to FIGS. 1-2, there is schematically shown a device, generally designated 10, for raising and lowering an impaired person between the ground and a higher level for boarding and deplaning from an airplane. The impaired person may be reposed in a wheelchair.

The device basically includes a wheeled frame 12 and means 14 for raising and lowering the person. As shown, the raising and lowering means 14 extend upwardly from the wheeled frame 12.

Oriented transversely in relation to the raising and lowering means 14 is a platform 16 which is adapted for supporting the impaired person or a wheelchair in which he or she may repose.

Mounted upon the platform 16 is a protective enclosure 18 which surrounds the impaired person, thereby providing shelter in adverse weather conditions.

FIG. 1 depicts the device 10 in a lowered configuration, while FIG. 2 depicts the device 10 in a raised condition.

In the preferred embodiment of the device 10 shown in FIGS. 1-2, the wheeled frame 12 includes a U-shaped body 20 having an open end 22. The raising and lowering means 14 enables the platform 16 to be positioned through the open end 22 at ground level. To permit use which spans over a flight of stairs extending from an airplane with attached steps, a sufficiently wide U-shaped body 20 is selected.

Means 54 for moving the wheeled frame to and from a loading position adjacent the parked airplane are attached to the U-shaped body 20.

Also, as seen in the device 10 in FIGS. 1-2, the platform 16 has a distal edge 24 adjacent the open end 22 of the wheeled frame 12. A ramp 26 is hingedly connected to the distal edge 24. The ramp 26 is pivotable between a reclined position 28 in which ground contact may be made for convenient access to and from the protective enclosure 18 by a wheelchair, and an inclined position 30. In that position 30, safe retention of the wheelchair during transportation is assured. Preferably, the platform is made of a 12 gauge aluminum diamond plate.

For moving the ramp 26 between the reclined 28 and inclined 30 positions, an actuator 32 is provided. The actuator 32 is mounted on the protective weather enclosure 18 and is operatively connected to the ramp 26 by a linkage including a hand lever (not shown) so that the ramp 26 may be pivoted between the reclined 28 and inclined 30 positions in a known manner.

In the preferred embodiment of the device 10 depicted in FIG. 3, the means 14 for raising and lowering the person basically includes a pair of spaced-apart guide members 34 extending upwardly from the wheeled frame 12. A cross bar 36 is elevationally movable in relation to the guide members 34. As shown, the platform 16 is attached to the cross bar 36.

So that the platform 16 may be raised and lowered, an hydraulic lift means 38 is provided. The hydraulic lift means 38 has a fixed end 40 and a movable end 42, the ends 40, 42 interconnecting the wheeled frame 12 and the cross bar 36. Preferably, the hydraulic lift means 38 comprises a 3-inch cylinder with a 2-inch ram that extends to about 3 feet. This permits a total elevation of 6 feet when used with a chain 56 and sprockets 58. Preferably, the sprockets 58 are mounted on ball bearings with a ⅝-inch shaft.

Returning now to FIGS. 1-2, the protective enclosure also includes a roof member 44 and a plurality of walls 46 depending downwardly therefrom. To provide added support for an occupant, a rail 48 is attached to the walls 46. To facilitate ingress into and egress from the protective enclosure 18, the rail 48 includes a distal portion 50 which extends beyond the walls 46.

Figure 4:
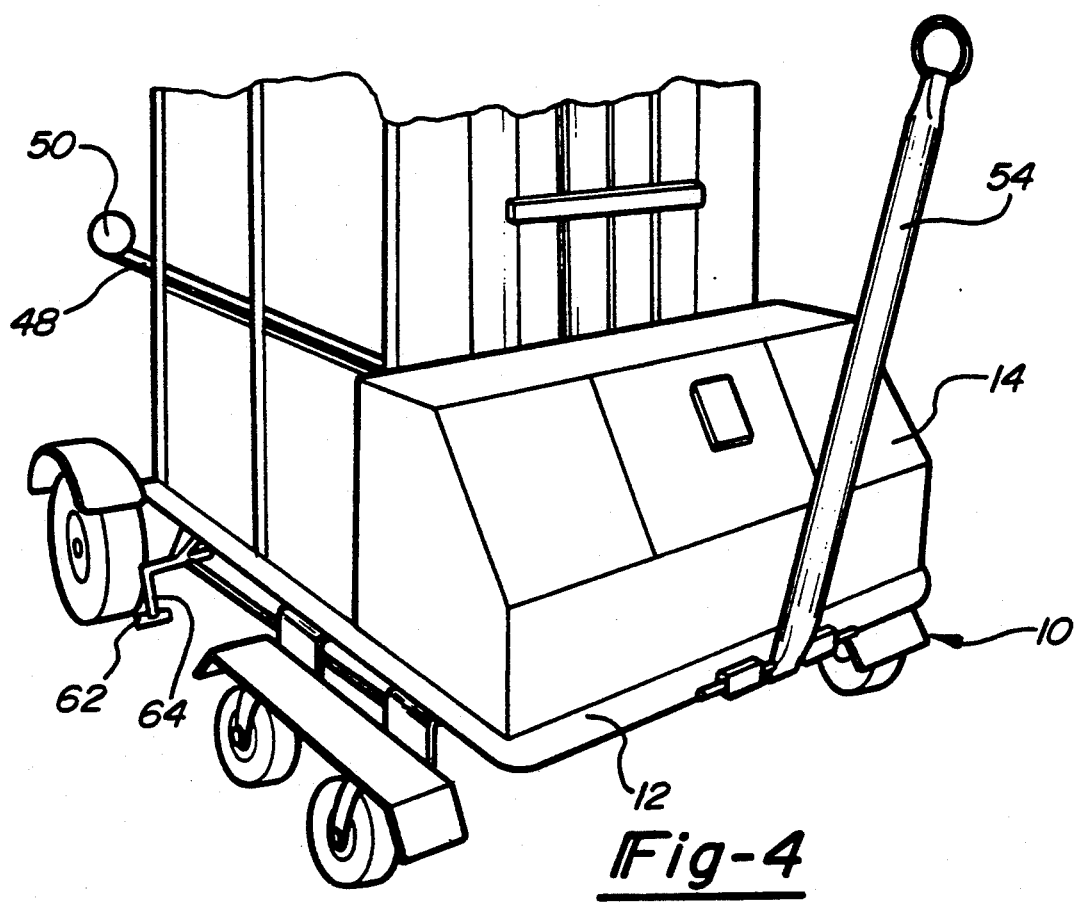
FIG. 4 is a quartering rear view, partly broken away, of the device for raising and lowering an impaired person between the ground and a higher level.

Referring now to FIGS. 2 and 4, a braking system 60 is applied to each rear wheel. The system 60 includes a shoe 62 which is attached to an angle arm 64. A suitable linkage 66 extends between the angle arm 64 and a brake handle (not shown). The linkage 66 enables an operator to apply the parking brake system 60 so movement of each rear wheel is arrested, thereby enabling an occupant to be transported by the device 10 in safety.

What is claimed is:

1. A device for raising and lowering an impaired person between the ground and a higher level for boarding and deplaning from an airplane, the device comprising:
    a wheeled frame having a U-shaped body including two longitudinal members connected together at a closed end and not connected at an open end, said wheeled frame having a direction of travel parallel to the longitudinal members;
    a pair of spaced apart guide members extending upwardly from the closed end of the U-shaped body;
    a cross bar elevationally movable in relation to the guide members;
    a platform attached to the cross bar;
    a single hydraulic lift means having a fixed end and a movable end, the ends interconnecting the wheeled frame and the cross bar, said lift means being centrally disposed on the closed end of the wheeled frame and extending upwardly from the wheeled frame, said lift means adapted to lower said platform completely to the ground;
    the platform being oriented transversely in relation to said lift means, the platform being adapted for supporting the impaired person on a wheel chair in which the person reposes wherein said lift means enables the platform to be positioned through the open end at ground level so that the impaired person is raised and lowered between the ground and the airplane by the platform, said platform further oriented in a parallel relationship to said direction of travel of said wheeled frame; and
    a protective enclosure mounted upon the platform, the enclosure surrounding the impaired person.

2. The device of claim 1, the platform having
    a distal edge adjacent the open end of the wheeled frame;
    a ramp hingedly connected to the distal edge, the ramp being pivotable between a reclined position in which ground contact may be made for convenient access to and from the protective enclosure by a wheelchair, and an inclined position for safe retention of the wheelchair during transportation.

3. The device of claim 2, further comprising:
    an actuator mounted on the protective enclosure and being operatively connected to the ramp so that the ramp may be pivoted between the reclined and inclined positions.

4. The device of claim 1, wherein the protective enclosure further comprises:
    a roof member; and
    a plurality of walls extending downwardly from the roof member.

5. The device of claim 4, wherein the protective enclosure also comprises:
    a rail attached to the walls for supporting an occupant.

6. The device of claim 5, wherein the rail includes a distal portion which extends beyond the walls for facilitating ingress into and egress from the enclosure.

7. A device for raising and lowering an impaired person between the ground and a higher level for boarding and deplaning from an airplane, the device comprising:
    a wheeled frame having a U-shaped body including two longitudinal members connected together at a closed end and not connected at an open end, said wheeled frame having a direction of travel parallel to the longitudinal members;
    a pair of spaced apart guide members extending upwardly from the closed end of the U-shaped body;
    a cross bar elevationally movable in relation to the guide members, a platform being attached to the cross bar;
    a hydraulic lift means having a fixed end and a movable end, the ends interconnecting the wheeled frame and the cross bar, said lift means being centrally disposed on the closed end of the wheeled frame and extending upwardly from the wheeled frame, said lift means adapted to lower said platform completely to the ground;
    said platform oriented transversely in relation to said lift means, the platform being adapted for supporting the impaired person on a wheel chair in which the person reposes wherein said lift means enables the platform to be positioned through the open end at ground level, the platform thereby adapted to transport the impaired person to said airplane so that the impaired person is raised and lowered between the ground and the airplane by the platform, said platform further oriented in a parallel relationship to said direction of travel of said wheeled frame; and
    a protective enclosure mounted upon the platform, the enclosure surrounding the impaired person and including a connected roof member;
    a plurality of wheels for supporting said frame on an airport operating surface on which the airplane is parked;
    distal edge adjacent the open end of the frame;
    a ramp hingedly connected to the distal edge, the ramp being pivotable between a reclined position in which ground contact may be made for convenient access to and from the protective enclosure by a wheel chair, and an inclined position for safe retention of the wheel chair during transportation.

* * * * *